United States Patent

[11] 3,555,286

[72] Inventor Lawrence Cote
Englewood, Colo.

[21] Appl. No. 754,703

[22] Filed Aug. 22, 1968

[45] Patented Jan. 12, 1971

[73] Assignee Data Products Corporation
Culver, Calif.
a corporation of California

[54] DISC FILE SYSTEM
6 Claims, 4 Drawing Figs.

[52] U.S. Cl. .......... 250/222,
200/61.62, 250/219, 274/2

[51] Int. Cl. .......... G01n 21/30

[50] Field of Search .......... 250/219I,
221DD, 222; 200/61.62(Inquired);
274/2(Inquired)

[56] References Cited

UNITED STATES PATENTS

| | | | |
|---|---|---|---|
| 2,475,744 | 7/1949 | Harman .......... | 274/2X |
| 3,242,341 | 3/1966 | Woodward .......... | 250/221 |

OTHER REFERENCES

Kuhne and Agon, IBM Technical Disclosure Bulletin, Vol. 4, No. 12, May 1962 pp 33. 250/219 Idd.

*Primary Examiner*—James W. Lawrence
*Assistant Examiner*—C. M. Leedom
*Attorneys*—Samuel Lindenberg and Arthur Freilich

ABSTRACT: Apparatus for use in a disc file system to sense the presence of a disc pack comprising a light sensor and lamp, both mounted on a bracket for movement onto opposite sides of the lower disc of the disc pack.

PATENTED JAN 12 1971 3,555,286

INVENTOR
LAWRENCE COTE

BY
Lindenberg & Freilich

ATTORNEYS

DISC FILE SYSTEM

BACKGROUND OF THE INVENTION

1. Field of the Invention

This invention relates to apparatus for sensing the presence of a disc in a disc file system which utilizes removable discs.

2. Description of the Prior Art

Disc file systems are memories which employ revolving discs with magnetically retentive surfaces. Read/write heads are positioned over the surfaces to store and retrieve information from them. Disc file systems are often used in computer-directed information processing systems, as compact means for storing large amounts of information.

One widely used type of disc file system employs removable, interchangeable sets of discs. This allows one disc file drive to be used with many sets of discs, in much the same way as different reels of tape can be used with one tape transport. A typical small disc file employs a removable set of discs known as a disc pact. A disc pack is comprised on one or more discs whose pairs of magnetic recording surfaces are protected from damage by an appropriate handling cover. The most popular disc pack employs a stack of six spaced discs whose ten inner surfaces only are used to store information. A timing disc is mounted against the bottom information storage disc. The timing disc has slots through which a light beam can pass, to indicate the rotational position of the disc pack.

A disc pack is typically utilized by placing it on a spindle of a disc file drive, sometimes referred to as a disc file. The spindle rotates the disc pack at a fixed high speed such as 20 to 60 revolutions per second. Positioning apparatus is provided for moving a group of read/write heads radially into the disc pack and over the information storage surfaces thereof.

Disc file systems with removable discs generally require provisions for preventing their operation unless a disc is in place. Thus, systems employing disc packs require sensors for determining whether a disc pack is positioned on the spindle which rotates the pack. Such a sensor is necessary because disc files are generally linked to larger data handling computer-directed systems, and must signal automatically whether they are capable of storing data. If a means for sensing the presence of disc pack is not provided, a disc file without a disc pack mounted thereon may be directed to write or read data, causing the loss of data and some computer system disruption. It is also desirable to provide means for sensing whether the cover of the disc file, which is opened only to receive or remove a disc pack, is closed. Without a cover closed on the machine, there is a hazard to human operators.

OBJECTS AND SUMMARY OF THE INVENTION

One object of the present invention is to provide an improved sensor for sensing the presence of a disc pack properly positioned in a disc file.

Another object is to provide a sensor for a disc file, which is of simple and economical construction.

In accordance with the present invention, a disc file is provided which includes sensor apparatus for sensing the presence of a disc pack. The sensor apparatus comprises a lamp which shines a beam through an area occupied by the timing disc at the bottom of a disc pack when the disc pack is properly installed. A photodetector is positioned to receive the beam when a disc pack is not installed. The interruption of the beam indicates that a disc pack is present and is properly installed.

In one embodiment of the invention, the sensor includes a lamp and a photocell which are mounted on a bracket to face each other, with a small gap between them. When a cover on the machine is closed over the disc pack, the bracket moves into the area normally occupied by a disc pack. If a disc pack is in place, the timing disc interrupts the beam ordinarily passing to the photocell. This interruption operates an interlock mechanism to enable energization of the spindle motor which rotates the disc pack. The bracket carries an additional lamp and photocell for detecting a reference slot in the timing disc, to indicate the rotational position of the disc. The outputs of the two photocells are coupled so that the presence of the slot over only one of them does not operate the interlock mechanism.

DESCRIPTION OF THE PREFERRED EMBODIMENTS

Figure 1:
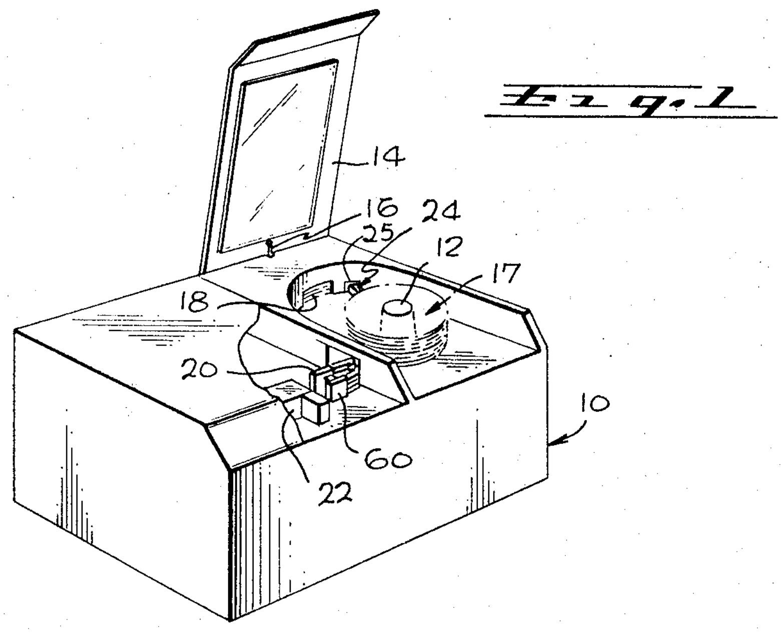
FIG. 1 is a perspective, partially cutaway view of a disc file constructed in accordance with the invention.

FIG. 1 shows a disc file drive 10 having a spindle 12 adapted to receive a disc pack. When a disc pack is in place on the spindle, a cover 14 is closed over the pack. A cable 16 attached to the cover is connected to a sensor apparatus 24, which detects the presence of a properly installed disc pack. When the cover is closed, the cable 16 allows the sensor apparatus to move from a reception area 25 in the disc file housing into a disc pack. Until a pack is detected on the spindle, a motor which drives the spindle cannot be energized. When a pack is in place and the cover is closed, the spindle 12 is immediately accelerated to full speed and maintained at this speed.

Immediately after the spindle 12 accelerates to full speed, a set of brushes moves from an area 18 to positions between the discs of a disc pack to remove dust particles. Then a head positioner assembly 20, which is propelled by a linear servomotor 22, advances the heads towards the spindle in order to position the read/write heads over the disc surfaces. The servomotor subsequently moves the heads over particular tracks in accordance with the track address command supplied thereto. Information signals to be recorded by the heads or which are to be read out by them, pass through wires connected to the heads. In this way, information is read into or out of the disc pack.

Figure 2:
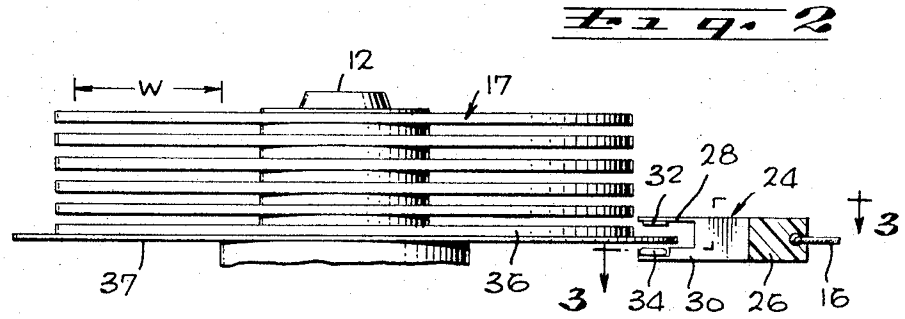
FIG. 2 is a partial side elevation view of a disc pack and a disc pack sensor of the disc file of FIG. 1.
Figures 3, 4:
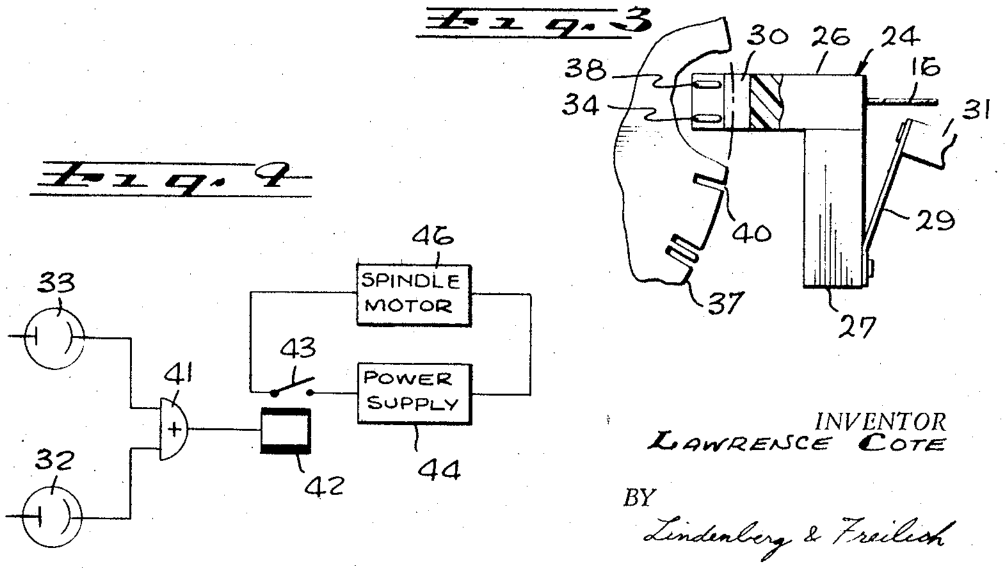
FIG. 3 is a partial plan view taken on the line 3–3 of FIG. 2, showing the arrangement of lamps of the disc pack sensor.
FIG. 4 is a schematic diagram of a circuit for coupling the disc pack sensor to the spindle motor.

The sensor apparatus 24 which senses the presence of a disc pack 17 on the spindle 12 is shown in greater detail in FIGS. 2 and 3. The sensor apparatus comprises a bracket 26 having an upper arm 28 and a lower arm 30. A pair of photosensitive cells 32 and 33 (cell 33 is behind cell 32 in FIG. 2) is positioned on the downward-directed face of the upper arm while a pair of electrically energized lamps 34 and 38 is positioned on the lower arm to face the photocells 32 and 33. The space between the photocells and lamps is sufficient to readily fit over the edge of both the bottom information disc 36 and the timing disc 37 of the disc pack. Until the sensor apparatus is inserted into a disc pack, the lamps 34 and 38 shine beams of light on the photocells 32 and 33, and the photocells generate electrical outputs. When the bracket 26 is inserted into a disc pack, both of the photocells cease to generate a signal. This causes circuitry, described below, to energize the spindle-driving motor.

The bracket 26 is mounted on an extension 27 which is coupled by a leaf spring 29 to a support 31, the support being fixed to the frame of the machine. The leaf spring 29 biases the bracket 26 toward the position shown in FIGS. 2 and 3 wherein it straddles a disc. The bracket 26 is also connected to one end of the cable 16 which extends over a pulley to the cover 14. When the cover 14 is lifted to place a disc pack on the spindle, the cable 16 pulls the sensor bracket 26 to withdraw it from the area occupied by the disc pack. When the cover is closed again, the sensor apparatus 24 moves to the position shown in FIG. 2 wherein a disc can block the beams falling on the photocells 32 and 33.

A principal reason for the use of two photocells to signal the presence of the disc pack is that the timing disc 37 has several slots indicated at 40 which define reference positions around the data tracks by means of circuitry (not shown). When the slot 40 is opposite one of the sensor lamps such as lamp 34, the photocell 32 will deliver an output, however brief. By using two photocells, only one of which can be opposite a slot at a time, the motor power need not be interrupted. FIG. 4 shows a simplified logic circuit for coupling the photocells 32 and 33 to a motor energizing relay 42. An OR gate 41 delivers a "-true" output when it receives at least one "true" input from the photocells. A "true" photocell output is the output delivered when the photocells receive substantially no illumination. A "true" output from the OR gate closes the contacts 43 of relay 42, to conduct current from a power supply 44 to the spindle motor 46.

Thus, so long as both photocells are illuminated, the spindle 12 cannot rotate. Only when the cover 14 is closed so that the bracket 24 can straddle a bottom disc, and only if a bottom disc is present at the proper level, can one of the light beams be interrupted. The close spacing of the bracket arms 28 and 30 reduces the possibility that any other object, such as the operatior's hand, can enter between the arms and interrupt the beams. Also, the fact that the sensor apparatus is received in the reception area 25 of the housing when the cover is opened, reduces such a likelihood. While an arm spacing is shown which can also accommodate the lower information disc 36, it can be reduced to accommodate only the timing disc if desired. Additional circuitry can be provided to assure that current is flowing through both lamps before the spindle motor can be energized.

Although particular embodiments of the invention have been described and illustrated herein, it is recognized that modifications and variations may readily occur to those skilled in the art, and, consequently, it is intended that the claims be interpreted to cover such modifications and equivalents.

I claim:

1. Apparatus for detecting the presence of a disc pack which includes a disc having timing slots at its periphery, comprising:

a bracket having a pair of arms for disposal on opposite side of said disc;

a pair of photocell means mounted on a first of said arms;

a pair of lamp means mounted on a second of said arms to shine a pair of light beams at said photocell means; and means coupled to said photocell means for preventing the rotation of said disc pack unless at least one of said photocell means detects an interruption of a light beam.

2. The apparatus described in claim 1 including means for covering and uncovering said disc pack coupled to said bracket to move it toward and away from the position at which said disc is normally situated.

3. The apparatus described in claim 2 including a housing disposed at least partially about the area at which said disc pack is received, including a reception area for receiving said bracket when said means for covering and uncovering is in an uncovering position.

4. In a disc file system including a spindle for holding and rotating a disc pack in an area about said spindle, wherein the disc pack has a disc with at least one slot in a peripheral portion thereof, the improvement comprising:

light means for directing a pair of light beams simultaneously across a portion of said area about said spindle which is occupied by said peripheral portion of said disc when said disc pack is fully installed on said spindle;

a pair of photocell means positioned opposite said light means for detecting the interruption of said beams by said peripheral portion of a disc pack in said area; and means coupled to said photocell means for preventing the rotation of said spindle means unless at least one of said light beams is interrupted.

5. The improvement described in claim 4 wherein:

said peripheral portion of said disc has at least a plurality of slots which are spaced by predetermined distances from each other; and said light beams are spaced by a distance different than the spacing between any two of said slots.

6. The improvement is a disc file system described in claim 4 including:

a bracket having a first arm for holding said photocell means and a second arm for holding said light means in opposed relationship to said photocell means to shield said photocell means from ambient light, said arms spaced apart to fit on either side of a disc of said disc pack;

cover means for covering and uncovering said area about said spindle; and means coupled to said cover means for moving said bracket toward and away from said area about said spindle in response to movement of said cover over and away from said area.